United States Patent
Trantham et al.

(10) Patent No.: US 8,924,641 B2
(45) Date of Patent: Dec. 30, 2014

(54) SELECTIVELY DEPOWERING PORTION OF A CONTROLLER TO FACILITATE HARD DISK DRIVE SAFEGUARD OPERATIONS

(75) Inventors: Jon David Trantham, Chanhassen, MN (US); Brian Dean Boling, Broomfield, CO (US); Dale Herbert Erickson, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 487 days.

(21) Appl. No.: 13/311,523

(22) Filed: Dec. 5, 2011

(65) Prior Publication Data

US 2012/0151162 A1    Jun. 14, 2012

Related U.S. Application Data

(60) Provisional application No. 61/422,549, filed on Dec. 13, 2010.

(51) Int. Cl.
*G06F 12/00* (2006.01)
*G11B 19/20* (2006.01)
*G06F 1/30* (2006.01)
*G06F 1/32* (2006.01)

(52) U.S. Cl.
CPC .............. *G06F 1/30* (2013.01); *G11B 19/2081* (2013.01); *Y02B 60/1246* (2013.01); *G06F 1/3268* (2013.01); *G06F 1/3237* (2013.01); *G06F 1/3206* (2013.01)
USPC .................................. 711/112; 711/E12.103

(58) Field of Classification Search
None
See application file for complete search history.

(56) References Cited

U.S. PATENT DOCUMENTS

| | | | |
|---|---|---|---|
| 5,872,669 A | 2/1999 | Morehouse et al. | |
| 5,872,670 A | 2/1999 | Ataee | |
| 5,889,629 A * | 3/1999 | Patton, III | 360/75 |
| 6,295,577 B1 | 9/2001 | Anderson et al. | |
| 6,516,426 B1 | 2/2003 | Forehand et al. | |
| 6,788,567 B2 | 9/2004 | Fujimori | |
| 7,395,452 B2 | 7/2008 | Nicholson et al. | |
| 7,533,298 B2 | 5/2009 | Smith et al. | |
| 7,904,604 B2 * | 3/2011 | Lum et al. | 710/5 |
| 2003/0131206 A1 * | 7/2003 | Atkinson et al. | 711/156 |
| 2006/0015683 A1 * | 1/2006 | Ashmore et al. | 711/113 |
| 2011/0016250 A1 * | 1/2011 | Lee et al. | 710/308 |
| 2013/0008725 A1 * | 1/2013 | Taylor et al. | 177/1 |

* cited by examiner

*Primary Examiner* — Sean D Rossiter
(74) *Attorney, Agent, or Firm* — Hollingsworth Davis, LLC

(57) ABSTRACT

In response to a hard disk drive losing primary power, power is obtained from a spinning motor of the hard disk drive. Portions of a controller of the hard disk drive are selectively depowered to facilitate performing safeguard operations via the controller using the power obtained from the spinning motor.

20 Claims, 8 Drawing Sheets

SELECTIVELY DEPOWERING PORTION OF A CONTROLLER TO FACILITATE HARD DISK DRIVE SAFEGUARD OPERATIONS

CROSS REFERENCE TO RELATED APPLICATIONS

This application claims the benefit of U.S. Provisional Application No. 61/422,549, filed Dec. 13, 2010, the content of which is incorporated herein by reference in its entirety.

BACKGROUND

The present disclosure relates generally to mechanisms that safeguard hard disk drives (HDDs) in the event of unexpected power loss. While HDDs have been proven to be robust data storage devices, certain precautions may be needed to protect mechanical parts of the drive from damage. For example, contact between a read/write head and a magnetic disk can cause damage to the disk. During drive operation, read/write heads ride a thin layer of air that separates the heads from the disks as they are spinning. This enables the heads to be in close proximity to the media surface for reading and writing to the media without allowing the heads to touch the surface of the disk.

The spinning disks maintain this layer of air that the heads ride upon, and so the heads could touch the disk if the disks stop spinning. As a result the read/write heads are often "parked" as part of a power-down sequence of the drive. Parking generally involves moving the heads to a reserved location on the disk where no data are stored or unloading the heads on to a ramp. Parking is typically performed to prevent damage to the surface of the disk and to reduce the amount of torque needed to restart the disk spindle motor. A HDD device may also have provisions for parking the head upon unexpected loss of power. For example, a reserve source of power, such as a still-spinning disk spindle motor, may be used as a generator to provide enough power to retract an actuator that parks the read/write head.

SUMMARY

Various embodiments described herein are generally directed to methods, systems, and apparatus with facilities to safeguard a hard disk drive in response to unexpected power loss. In one embodiment, a controller is capable of being coupled to circuitry of a hard disk drive. The controller is configured to, in response to the hard disk drive losing primary power, obtain power from a spinning motor of the hard disk drive. The controller is further configured to selectively depower portions of the controller to facilitate performing safeguard operations via the controller. The safeguard operations are performed using the power obtained from the spinning motor.

In another embodiment, an apparatus includes a power loss detection circuit configured to provide a power loss signal in response to the apparatus losing primary power. The apparatus includes a power supply circuit and controller coupled to the power loss detection circuit. The power supply circuit is configured to provide shutdown power from a spinning disk motor of a hard disk drive in response to the power loss signal, and the controller includes portions that are selectively depowered in response to the power loss signal. The apparatus is configured to perform safeguard operations of the hard disk drive using the shutdown power in response to the power loss signal.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
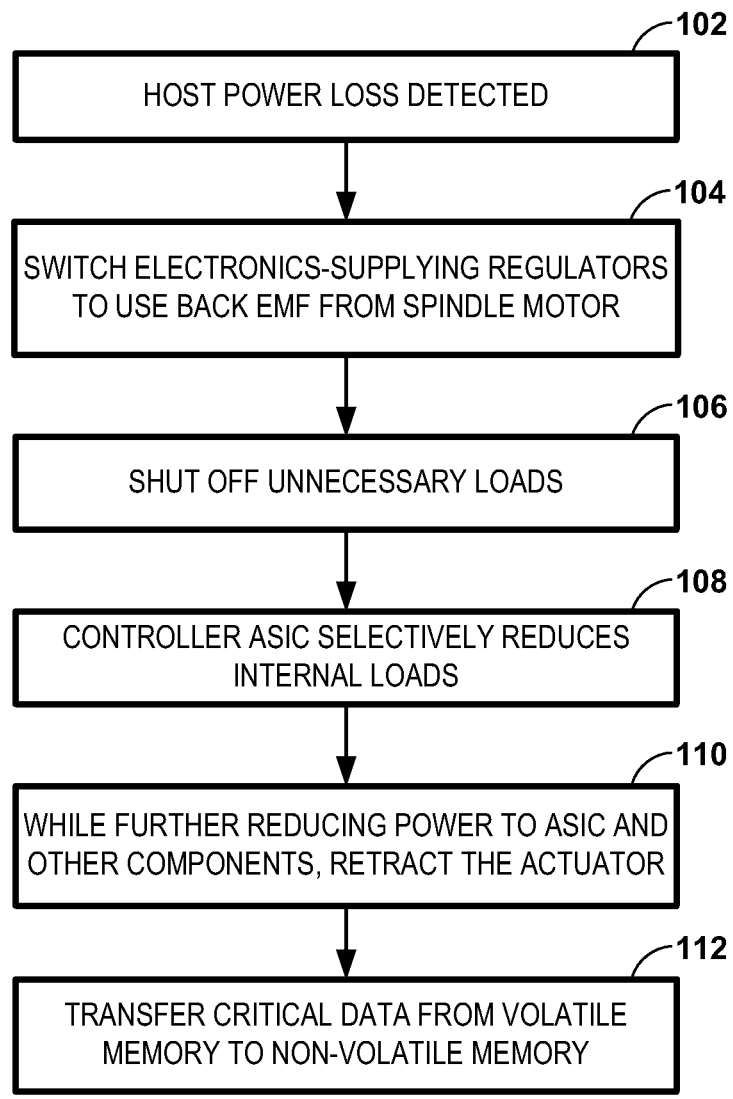
FIG. 1 is a flowchart illustrating a procedure according to an example embodiment.

The present disclosure generally relates to safeguarding a hard disk drive (HDD) in the event of unexpected power loss. The term "safeguard" generally refers to any processes needed to prevent data loss and/or physical damage to the device. For example, each HDD read/write head may be built into a slider assembly with an air-bearing surface facing a magnetic disk. When the disks are spinning at full speed, the slider is prevented from contacting the disk by a thin layer of air. However, if this disk is not spinning, the slider may contact the disk surface, which could lead to loss of data at the contact point. Additionally, heads in contact with the disk surface can greatly increase the amount of torque required to start the spindle motor. As a result, the head(s) are parked (e.g., moved to an inner-diameter location where no data are recorded or on to a ramp) before the disk motor stops spinning.

Another example of a power loss safeguard is to store unwritten volatile data to a non-volatile memory. For example, in order to improve write performance, a HDD may buffer data transferred between the disk and a host in a volatile memory cache. This cache may include an electronic volatile memory such as static random access memory (SRAM) and/or dynamic random access memory (DRAM). Caching can improve command completion time, for example if there is some delay in writing the data to the media (e.g., long seek time, sectors that need extra time to write). Other non-user data may also be held in volatile RAM, such as address mappings, run-time measurements and statistics, etc.

Data stored in volatile RAM may need to be preserved in a non-volatile storage in response to the loss of system power. During a normal shutdown (e.g. when commanded by a SCSI Stop Unit command), this volatile data may be written directly to the primary storage media (e.g., magnetic disk) using host power before it is removed. However, upon unexpected loss of host-system-supplied power, it generally isn't possible to transfer this data to the magnetic disks. In such a case, alternate non-volatile media such as flash memory may be used to temporarily store the data. When power is reapplied, this data may be restored from the alternate non-volatile media to the magnetic disks and/or placed back in volatile RAM.

In some implementations, the kinetic energy of the still spinning disks can be used to generate sufficient power to perform these and other power loss safeguard operations. A spindle motor can, in addition to converting electricity to motion, act as a generator, e.g., converting motion to electricity. In some systems, upon detection that host-supplied power has been lost, a circuit connects the spindle motor to a power bus. With the mass of the spinning disks providing rotational inertia, the spindle motor can often provide enough power to complete some safeguarding operations, such as retracting the read/write head actuator and storing cached write data in non-volatile memory. However, the amount of energy available this way may sometimes be insufficient to perform all desired safeguarding operations, depending on the type and configuration of the HDD.

One general trend in electronics is to reduce size and weight of devices, and HDDs are no exception. The need for small, power-efficient drives for laptops and other portable devices has led to the introduction of small form factor drives. For example, in contrast to the 3.5 inch (and larger) form factor drives associated with desktop computers, portable computers generally use a 2.5 inch form factor (or smaller hard drive). The 2.5 inch and smaller drives are suitable for other applications besides mobile computing. For example, in data centers with racks of densely-packed servers and computers, space, power, and cooling may all be at a premium. Due to their low power consumption and small size, the 2.5 inch form factor drive is becoming widely used in these types of data centers.

While 2.5 inch drives may be efficient, the disk(s) in a 2.5 inch drive may not have as much rotational inertia as a 3.5 inch drive. As a result, it can be challenging to perform desired power loss safeguard operations using power from the spindle motors of 2.5 inch drives. It will be understood that these challenges need not be limited to the smaller drives, however. Factors such as increased cache size, more complex controllers with higher gate counts and electrical power leakage, and use of fewer media disks, etc., can cause similar issues with larger drives as well. In view of this, the present disclosure relates to apparatuses and methods that can enable a hard drive device to perform a number of safeguarding operations upon power loss. These techniques are suitable for drives with reduced amounts of spindle motor-generated power relative to the power required for the safeguarding operations.

As will be described in detail below, a data storage apparatus may include a number of features to assist in performing desired safeguarding operations using a limited amount of spindle-motor-generated power. Those features may include any combination of: host power loss detection; fast interrupt capability for swift power-loss reaction by controlling electronics; electronics power switchover circuitry; selectable power saving application-specific integrated circuit (ASIC) features (e.g., power islands, subsection resets, subsection clock shutoff control, low-power memories, processor with "wait-for-interrupt" low power mode); dynamic random access memory (DRAM) with self-refresh capability; retract-in-progress communication between motor controller and controller ASIC; and high-speed non-volatile memory (e.g. high-speed NOR flash or phase-change memory).

In reference now to FIG. 1, a flowchart illustrates a high-level summary of a power-loss safeguarding procedure according to an example embodiment. The procedure begins when host power loss is detected at step 102. Supplies to electronic regulators are switched over at step 104 to use back electromotive force (back EMF) energy from the spindle motor as a power source. Blocking FETs are activated at the same time to prevent the spindle energy from leaking back into the host.

In addition to providing data-loss protection, a device implementing a power-switchover solution as described herein will maintain an electrical load that is similar to equivalent drives without this feature. For purposes of this discussion, an equivalent drive generally refers to a drive of similar power consumption characteristics, but the equivalent drive does not include circuitry for switching over to use back EMF as a power source and/or facilities to back up volatile data to a non-volatile storage. For example, host system power supplies are often designed for drive motors being attached to the +12V rail and the electronics being attached to the +5V rail. By using the illustrated power-switchover circuits, the accustomed electrical load is placed on the +5V and +12V host power rails during normal operation, while still being able to safeguard the volatile cache data via the +5V rail. This is in contrast to a design that always runs the electronics off of the +12V rail. For systems with only a single power supply (e.g. +12V only), no switchover may be necessary. All electronics run off of the single rail and the spindle energy is applied back to the single power rail.

At step 106, unnecessary loads are shut off. This may involve a power device notifying the hard drive controller (e.g., ASIC) of the power loss. In response, the controller shuts off unnecessary electronics external to the controller, such as the preamp, the preamp's negative voltage regulator, and the read channel. In this context, the term "unnecessary" generally refers to any circuits and components not strictly needed to perform the desired safeguarding operation. So, for example, if the safeguarding operation does not involve the read/write head beyond parking the head via the actuator, any electronics coupled to the read/write head (e.g., preamplifiers, heaters, sensors) may be disabled at this time.

As indicated at step 108, the controller ASIC may also reduce its internal power loads, e.g., in response to receiving notification of the power-loss detected at step 102. This may be accomplished by putting unneeded sections of the ASIC into low power state. For example, ASIC portions that deal with host communications (e.g., block and physical layer), formatter, and servo processor may be placed into a low power state. These portions of the ASIC may have power selectively removed, and/or be reset with their clocks are shut off. Memories within the ASIC may also be placed into a shutdown mode.

At step 110, the device retracts (e.g., parks) the actuator that moves the read/write heads. During this operation, power to some components (e.g., controller ASIC) may temporarily be reduced even further, because retracting the actuator may briefly consume a relatively large amount of the available power. This may also involve putting DRAM used by the ASIC into self-refresh mode and putting the controller processor in a "wait for interrupt" mode. The power device notifies the controller processor when retract is complete via a "retract in progress" signal. The controller processor, operating in "wait for interrupt" mode is periodically awakened via a timer interrupt and checks the "retract in progress" signal. After the retract is complete or after a fixed period of time has elapsed the processor reactivates the DRAM and execution continues.

Another step involved in the safeguard operation involves transferring at step 112 critical information from volatile memory to non-volatile memory. This information may include cached user data that has not been written and/or verified to the magnetic disks. The volatile data may also include state data, metadata, ECC parity, and any other data needed by the device upon resumption of power. The order in which volatile data are stored may be prioritized. For example, metadata critical to the integrity of the drive could be written ahead of data used to improve the drives data-reliability. That way, if insufficient power exists for the non-volatile data to be written in its entirety, the effects associated with the incomplete writing can be minimized.

It will be appreciated there is a limited amount of time to perform the transfer at step 112 before the spindle-motor supplied power is lost. To quickly store the information, high-speed non-volatile memories may be used to temporarily store data, after which the data can be moved to the hard drive media upon resumption of normal operations. Some examples of this type of memory may include high speed versions of NOR flash memory, NAND flash memory, NvS-RAM, and phase-change memory (PCM). The non-volatile memory may include serial-peripheral interface (SPI) devices. In such a case, data transfers 112 may be performed using dual or quad-bit data bus interfaces to improve throughput and decrease data transfer times.

It will be understood that the sequence of events shown in FIG. 1 is provided for purposes of illustration and not of limitation. It is contemplated that some or all of the individual operations may be performed in substantially in parallel. For example, switching at step 104 to back EMF, load reduction at steps 106, 108, and data transfer at step 112 may all be triggered by a common signal and be performed in parallel. In such a case, the actuator retraction at step 110 may pre-empt some or all of these operations while retraction is in progress. In other cases, some operations may be performed in series, but in a different order than illustrated.

Figure 2:
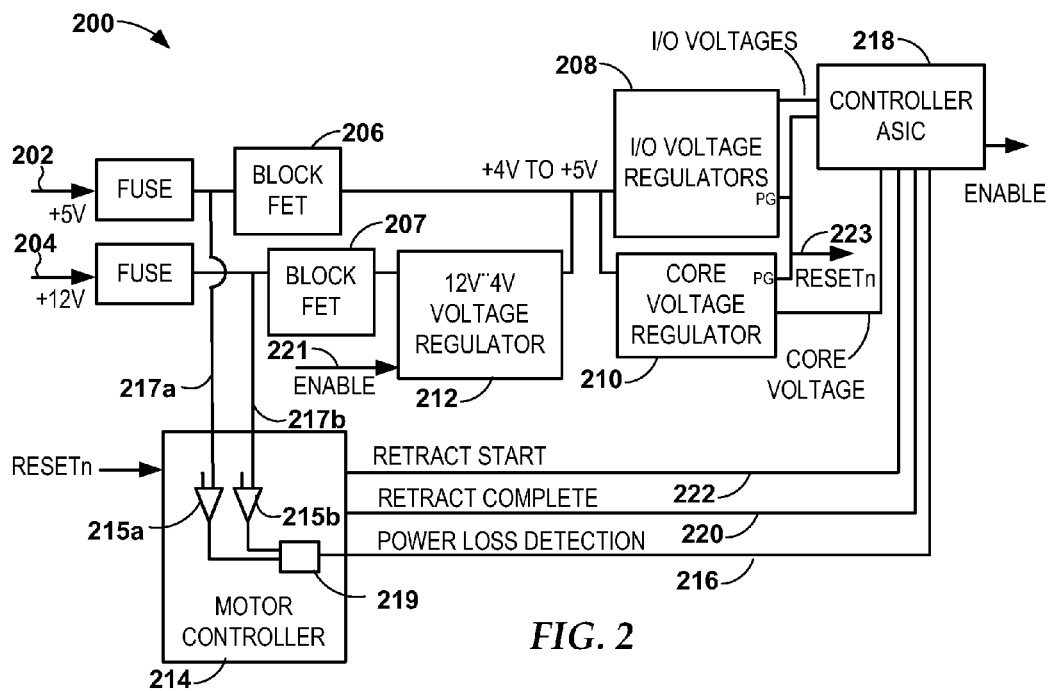
FIG. 2 is a schematic diagram of power circuitry according to an example embodiment.

In reference now to FIG. 2, a block diagram illustrates power loss detection and switchover circuitry for a disk drive device 200 according to an example embodiment. Host power is provided via 5V and 12V lines 202, 204. In order to detect host power loss, a power loss detection circuit in a motor controller 214 may contain comparators 215a, 215b coupled to both the +5V & +12V lines via paths 217a, 217b. When either or both +5V & +12V lines fall below a threshold (for example, −10% of nominal) outputs of the comparators 215a, 215b are combined via logic block 219 (e.g., AND gate, OR gate, etc.) to assert a power loss detection signal 216. When the power loss detection signal 216 is asserted, blocking FETs 206 and 207 are switched to isolate spindle-generated power from the host, and the internal components of the disk drive device are switched over to receive power generated from the spindle motor.

The switchover is accomplished using the blocking FETs and voltage regulators. An embodiment of the switchover circuitry is also shown in FIG. 2. Blocking FET 206 normally connects host-supplied +5V to the regulators 208, 210 that power the electronics. Regulators 208 and 210 have internal "power-good" (PG) output signals, which are combined to form RESETn signal 223. A power supply circuit that provides shutdown power may include a switching voltage regulator 212 (e.g., a National Semiconductor LM2734 regulator). The switching voltage regulator 212 is biased to 4V, causing it normally to be in standby while host power is present. The switching regulator selected for 212 should be tolerant of the maximum input voltage present (12V or higher) and should be capable of standing-by indefinitely unloaded—likely with a higher voltage present on its output than its feedback set point—and then immediately actively running when the voltage on its output drops below its set point. When power loss is detected, the blocking FET 206 is switched to block, and the regulator 212, if enabled via the NVC_ENABLE signal 221 supplies power to regulators 208 and 210 from the +11V rail. The +11V rail is not shown, but lies between the blocking FET 207 and the regulator 212.

The motor controller device 214 also controls a voice coil motor (VCM) that drives an actuator that moves the read/write heads. Upon power loss, the motor controller may brake the actuator (e.g., if a seek is in progress) and then park the recording heads. As will be described in greater detail below, the start and end of this event will be communicated to the controller ASIC 218 via signals 220, 222. This allows the ASIC 218 to take additional power saving measures to ensure the actuator has enough power to park the heads.

A hard drive device may have controlling electronics within one or more ASICs (e.g., system-on-chip). In reference now to FIG. 3, a block diagram shows features of an ASIC 300 according to an example embodiment. To enable more efficient operation, it may be desirable to have portions of the ASIC that can be quickly de-energized upon loss of system power connected on a separate voltage-supply rail. This is accomplished by having these portions on separate ASIC "power-islands." The power-island is designed such that removing its power will not disrupt the function of the rest of the ASIC 300 for a particular purpose, such as safeguarding read/write heads and volatile data upon loss of power.

In the illustrated ASIC 300, read channel 306 and formatter 304 may be part of read channel power island 302. This island 302 may be formed by coupling these components to a common power supply that can be independently switched off relative to other components. This allows, for example, selectively depowering the formatter 304 and read channel 306, which may not be needed to perform power-off safeguard operations, while allowing the microprocessor 308 to remain powered.

The microprocessor 308, like many modern microprocessors, may contain interrupt mechanisms. Some microprocessors are available with non-maskable interrupts (NMIs) or fast interrupts (FIQs) or both. Because the microprocessor 308 should respond quickly to loss of host power, a NMI or FIQ type of interrupt may be used (if available) to invoke the shutdown operations. The shutdown instructions may be encoded in firmware (not shown), and executed by the microprocessor 308 to perform subsystem shut-down and other tasks necessary to minimize the ASIC's power consumption.

Some sections of the ASIC 300 may not be needed for the power-loss safeguarding, but for various reasons may not be kept on a separate power island. In those cases, it may be desirable to have individual resets, as represented by reset control component 310. When power is lost, the ASIC firmware can send a signal to reset control 310, which can selectively place certain sections in reset, minimizing their power.

In addition to placing selected sections in reset, further power reduction can be accomplished by shutting off the clock signals to some sections. This may be used in cases where circuitry may continue to operate even when the section is in reset. The selectable shutting off of clock signals may be performed via clock control component 312. When power is lost, the ASIC firmware can direct the clock control 312 to selectively shut off clocks to selected circuitry blocks, e.g., in conjunction with reset controller 310 placing selected circuitry blocks into reset.

It is possible to design the ASIC using SRAM 314 with low-power modes. These modes allow the SRAM 314 to be either placed in stand-by (reducing power without data loss) or shutdown (reducing power even further, but with data loss.) For this design, the ASIC 300 may be designed with low-power mode memories, and when power is lost, the SRAM 314 within the ASIC 300 can be switched to the lowest power-consumption state possible for a given mode and/or function.

Microprocessors, such as ASIC processor 308, may provide low power operating modes which can also be utilized in response to unexpected power loss. For example, an ARM Cortex R4 provides a mode called "wait-for-interrupt" where its power is greatly reduced. In the illustrated ASIC device 300, the controlling microprocessor 308 can be placed in a low-power-consumption wait-for-interrupt-type mode wherever possible, for example while waiting for the actuator to retract or for a flash page to program.

As previously described, peripheral circuits outside of the ASIC 300 may also be directed by the ASIC to shutdown and/or go to a low power mode. For example, read preamplifiers may be turned off. Also, the DRAM used to buffer storage device data may be provided outside of the ASIC, e.g., coupled to a system memory bus. The buffer DRAM and its bus termination circuitry may consume substantial power. Some DRAMs support a "self-refresh mode" where the clock and interface can be shut off. When the DRAM is not being actively used, it can be put into self-refresh and its interface can be shut down. This mode may be used, for example, where data cached in the DRAM has not yet been completely transferred over to non-volatile memory, but due to some other event (e.g., actuator retract) the transfer needs to be paused.

Generally, a solid-state, non-volatile memory may be used to receive volatile data from DRAM or other volatile memory. Due to space and pin constraints, HDDs may use Serial Peripheral Interface (SPI) flash devices for program and data storage. Many of these devices may need thousands of microseconds to program a 256-byte page. Other serial flash devices can program pages in hundreds of microseconds. In a device according to the embodiments described herein, these faster parts may be employed, either alone or in combination with other types of non-volatile memory, to back up at least some data from volatile RAM. Some types of non-volatile, solid-state memory may support dual or quad-bit transfer modes. The illustrated embodiments may also use dual or quad-bit transfer modes to minimize the data transfer overhead.

Depending upon the available kinetic energy of a particular drive, it may be necessary to minimize power consumption during the time of actuator retraction. Because the duration of the actuator retraction may be variable, and because it is desirable to minimize the period of time waiting for the actuator to retract, the system may be arranged to communicate when the actuator retraction is in progress and when it has completed. This information may be communicated from the motor controller to the controlling microprocessor 308, for example via one or two signal lines to a general-purpose I/O pin (one indicating retract is complete and an optional one indicating retract is in progress).

Whether or not to write/program any data to non-volatile memory prior to the start of actuator retract depends upon whether the drive has sufficient energy to support the start of programming prior to retract, and still reliably retract the actuator. This may depend on a number of factors, including current position of the actuator, amount of data to be programmed, current speed of the disk motor, disk count, baseline power generation capability of the spinner motor, etc. If it does not have sufficient energy, then programming may begin after the actuator has retracted. In such a case, the system may be arranged to communicate retract-in-progress to a microprocessor or other memory controlling device.

Figure 3:
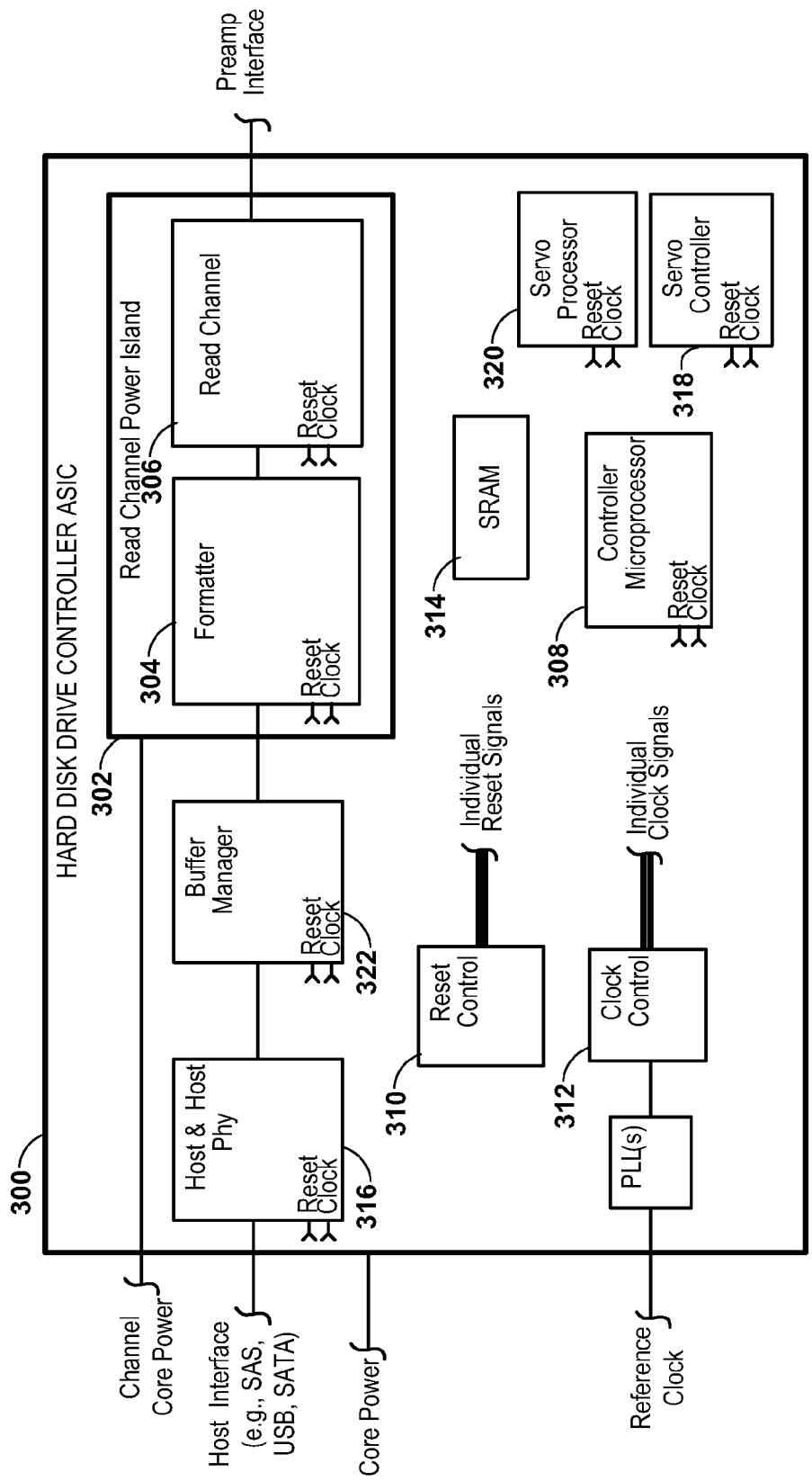
FIG. 3 is a block diagram of a controller ASIC according to an example embodiment.

Although FIG. 3 shows one embodiment of a controller ASIC, many other permutations are possible in view of the present teachings. For example, other sub-sections within the controller ASIC 300 may be placed on separate or common power-down domains, such as the PHY(s) 316, formatter 304, servo controller 318, servo processor 320, etc.

Figure 4:
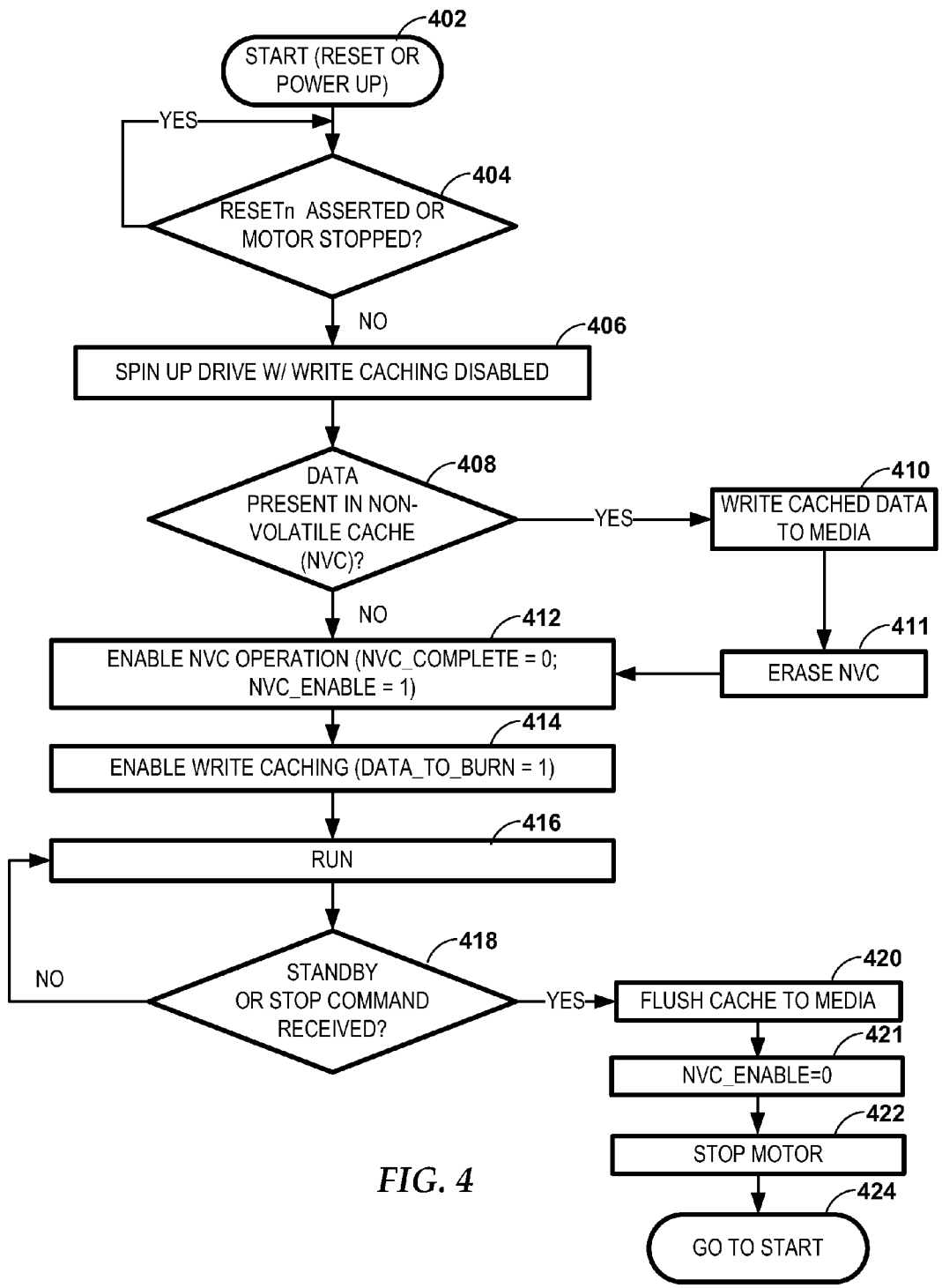
FIG. 4 is a flowchart of a startup procedure according to an example embodiment.

In reference now to FIG. 4, a flowchart illustrates a disk drive non-volatile caching system behavior procedure according to an example embodiment. This procedure may be implemented in power control and monitoring circuitry. The procedure in FIG. 4 makes reference to a system signal RESETn, which represents a state of multiple voltage regulators, and may be implemented as a discrete signal to the controller ASIC. An example of RESETn is indicated as signal 223 in FIG. 2. In this system, a reset is asserted by holding RESETn low, although the embodiments need not be limited to this configuration.

The procedure begins at step 402, which represents a start state of an HDD device. The start state may be entered due to application of power, or due to a reset. The device waits at step 404 until RESETn is not asserted and the drive motor is not stopped (e.g., begins spinning) Once RESETn is not asserted and the drive motor is started, the drive is allowed to fully spin up at step 406 with write caching disabled. If it is determined at step 408 that data are present in the non-volatile cache (NVC) (e.g., written there due to an unexpected power loss), the cached data may be written at step 410 to the media (or any where else appropriate) and the NVC can be erased at step 411. This erasure may be optional at this particular time, depending on the remaining capacity of the NVC and/or any other uses that may be made of the cached data and whether the memory type actually requires an erase (e.g. PCM and MRAM don't require erasure before being rewritten). However, some memories such as flash cannot be directly overwritten, but are first erased before new data are written. Therefore erasure at this stage (or shortly thereafter) ensures the NVC will be available for writing as soon as possible if another unexpected power loss occurs.

If no data are present in the NVC at block at step 408, then it may be presumed that the NVC memory is ready to store data upon power loss. At this point, the NVC can be enabled at step 412 for operation. This may also involve setting at step 414 a system variable to enable write caching, after which the drive can operate at step 416 in write caching mode until instructed otherwise. This also involves setting NVC_ENABLE signal shown in FIG. 2 high. Generally the device will remain in the state at step 416 for normal operation until power is lost or a standby or stop command is received. If a standby or stop command at step 418 is received, the drive can perform an orderly shutdown. An orderly shutdown may involve, among other things, flushing at step 420 data from the cache to the hard drive media (magnetic disk), turning off at step 421 the NVC_ENABLE signal, stopping at step 422 the motor, and going to the state at step 424, where the device is ready for a power up and/or reset. Note that in addition to host-commanded standby or stop commands, any other operations in the drive that cause the motor to shut down or reduce speed (e.g. idle power-savings modes) may also comprise a standby or stop transition. If the drive is running (the state at step 416) and power is lost, then the drive will follow the flowchart outlined in FIG. 1. Upon completion of FIG. 1 the controller will reset and we go back to start at step 402.

Figure 5A:
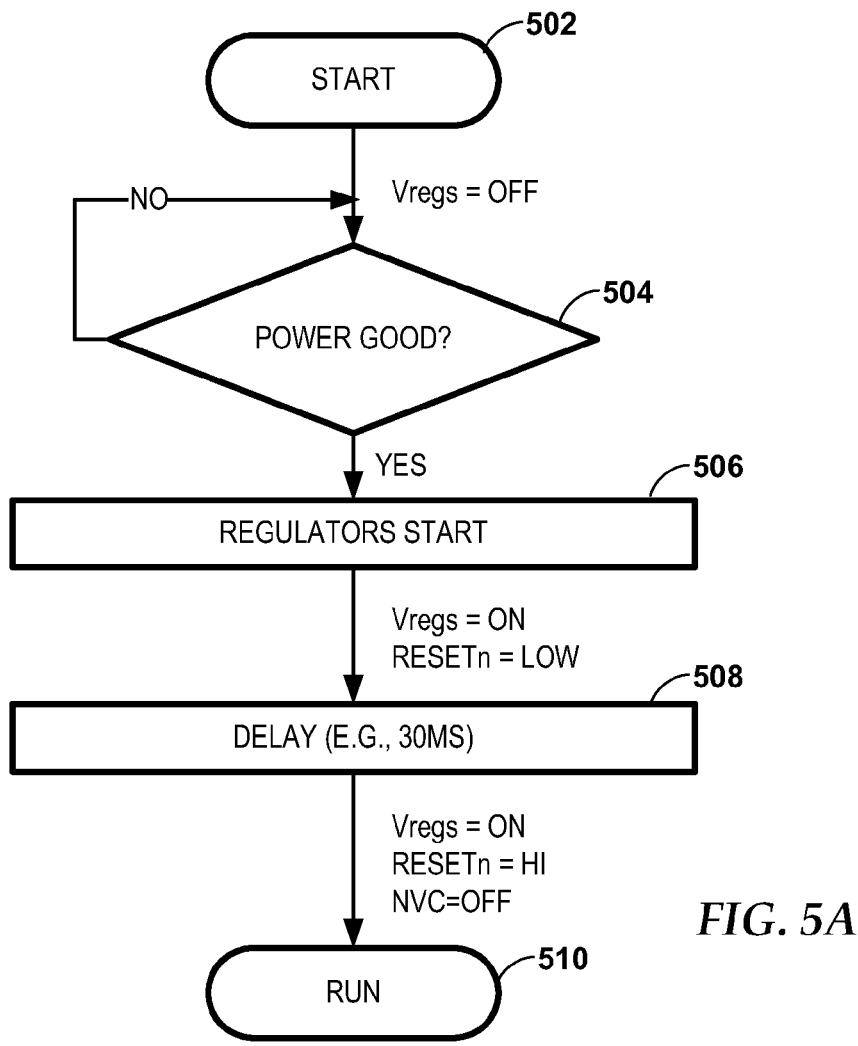
FIGS. 5A, 5B, 6 and 7 are flowcharts of additional procedures according to example embodiments.

In reference now to FIG. 5A, a flowchart illustrates the behavior of voltage regulators at power-up and their control of the RESETn signal according to an example embodiment. This procedure may be implemented in power control and monitoring circuitry. The illustrated procedure makes reference to two variables, Vregs and RESETn, the latter having been discussed above. The Vregs variable indicates whether the voltage regulators (which may be required for controller ASIC operations) are on or off. At step 502 of the procedure, Vregs is "OFF," and as a result, RESETn is asserted (set to low). When sufficient voltage is present as determined at step 504, voltage regulators start operating at step 506 (indicated as Vregs to "ON,") although the RESETn is still asserted. Many voltage regulators are available that have open-collector power-good output signals. These can be wired together with a pull-up resistor to form a RESETn signal. For example, regulators 208 and 210 in FIG. 2 are shown with PG (power-good) signals combined to form RESETn 223 (pull-up resistors not shown). A delay at step 508 allows the electronics to fully power-up with reset applied. The delay can be accomplished by using power-regulators with built-in delay on their PG signals, and/or by wiring the power-good signals into a "reset monitor" device. After the delay, the RESETn is de-asserted as well, after which the controller ASIC can begin running at step 510. It should be noted that the NVC state value (which governs availability of the non-volatile cache) is still set to OFF. The NVC value set separately via a register bit, as shown in the example embodiment illustrated in FIG. 5B.

Figure 5B:
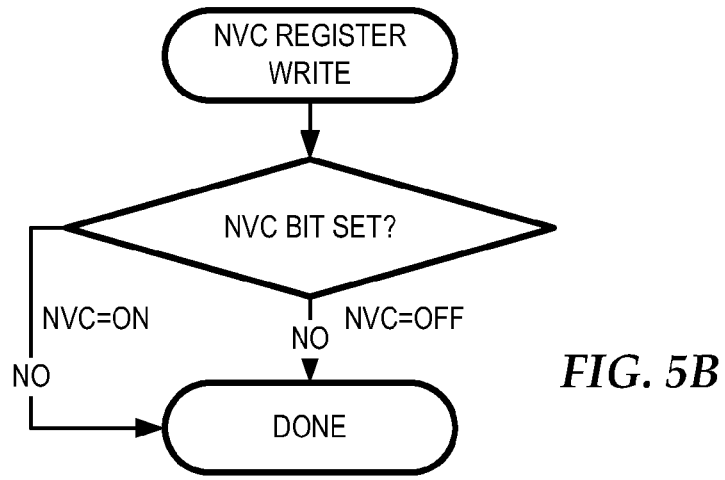

The flowchart in FIG. 5B shows the control of a system state variable for whether or not NVC is enabled. As is shown later in FIG. 7, the behavior of the system on power loss varies, depending upon whether or not the NVC system is enabled. Firmware uses this bit to inform the system whether it wants the system to perform the NVC storage function upon power loss. In some cases firmware will not want the system to perform any storage. For example, if the host system has issued a command to stop the unit, firmware will typically store the data to the magnetic media first, so that no programming is necessary. In this case the firmware will shut the state bit off. As is shown in FIG. 5A, the NVC system is defaulted-off at power-on after step 508. Firmware can enable the system and turn on the NVC bit after it has readied the non-volatile storage component (as is shown in FIG. 4, step 412).

Figure 6:
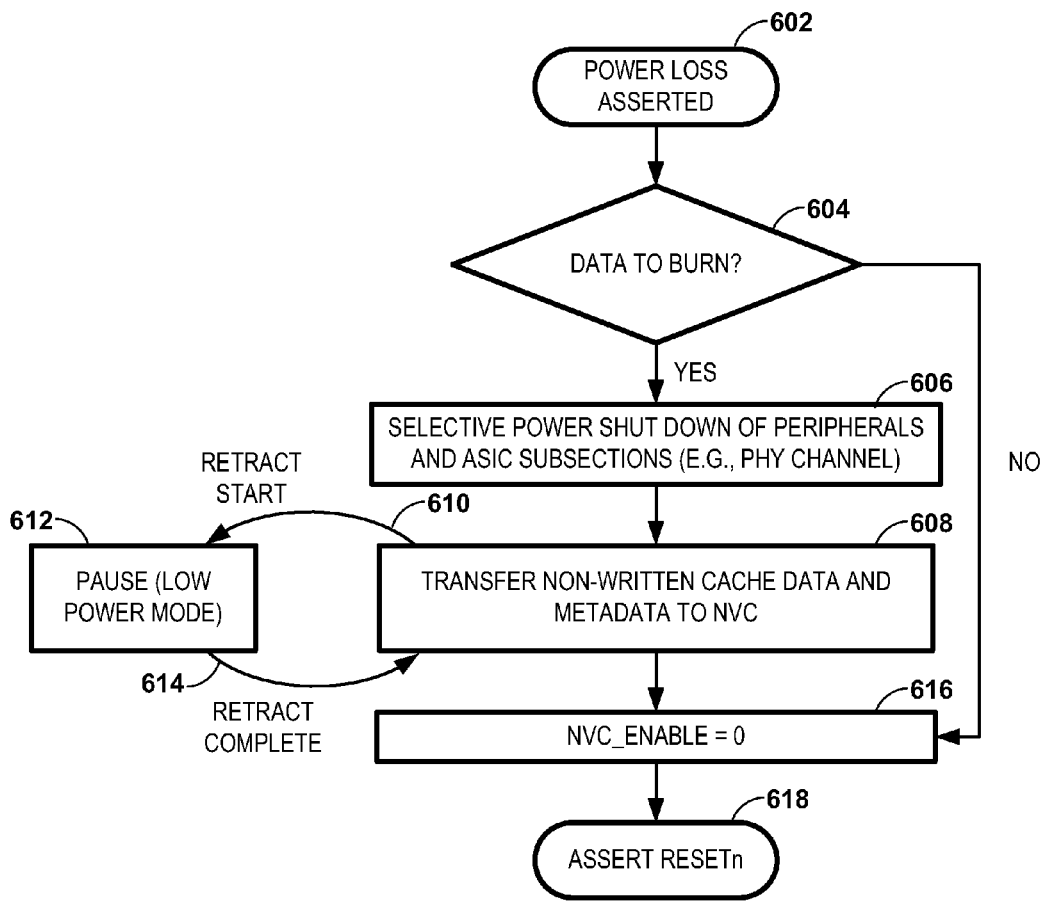

In FIG. 6, a flowchart illustrates a procedure to store volatile data in response to a power loss according to an example embodiment, providing further details to what was earlier shown in FIG. 1. The procedure begins when power loss is asserted at step 602, e.g., via circuitry shown in FIG. 2. A determination at step 604 is made as to whether the volatile cache has data that needs to be stored/burned to the NVC. If so, a selective power shut down at step 606 of peripherals (e.g., PHY channel, preamplifier, etc.) can be performed, and the data transferred at step 608 to the NVC. Any time during this transfer, a retract start signal at step 610 may be received, indicating the read/write head actuator is beginning to park the head. In order to ensure the actuator has enough power for the retraction, the transfer process pauses at step 612, which may also be accompanied by other power saving operations (e.g., putting DRAM in self-refresh mode, causing controller ASIC to suspend operations).

When the actuator retract is completed, signal 614 is received, allowing the transfer at step 608 to non-volatile memory to continue. If and when all data are transferred to the NVC, a message (meaning "NVC complete") is written to NVC at step 616. This message can be used after restart to determine whether volatile cached data was completely transferred. If not, additional measures may be needed, such as checking for incomplete and/or corrupt pages stored in the NVC. After storing the "NVC complete" message, the procedure exits at step 618 by asserting RESETn.

Figure 7:
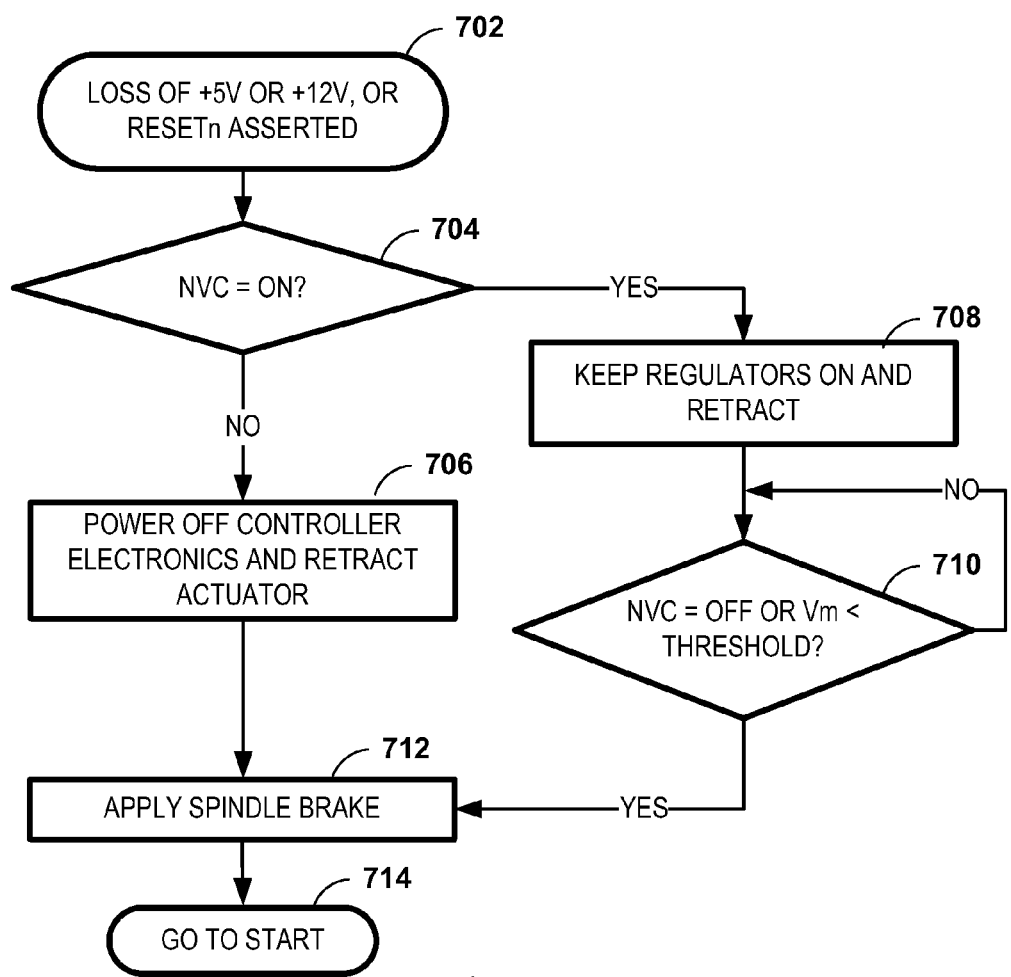

In reference now to FIG. 7, a flowchart illustrates the loss-of-power procedure from the perspective of the motor controller when the spindle motor is spinning. The procedure is triggered at step 702 by loss of at least one of +5V and +12V supplies, or by RESETn being asserted. If it is determined at step 704 that the NVC is off, then the voltage regulators can be powered off (e.g., no need to backup a volatile memory cache) and the read/write head actuator retracted at step 706. If NVC is on, the regulators remain on while the actuator is retracted at step 708, and loop at step 710 ensures the regulators remain on as long as needed to backup the volatile data (e.g., NVC=off) or until the motor-supplied voltage Vm (motor voltage) falls below a threshold. Optionally at step 712 the spindle motor is braked for safe-handling or wear reduction. At the end of the procedure, the device is in a start state at step 714.

Figure 8:
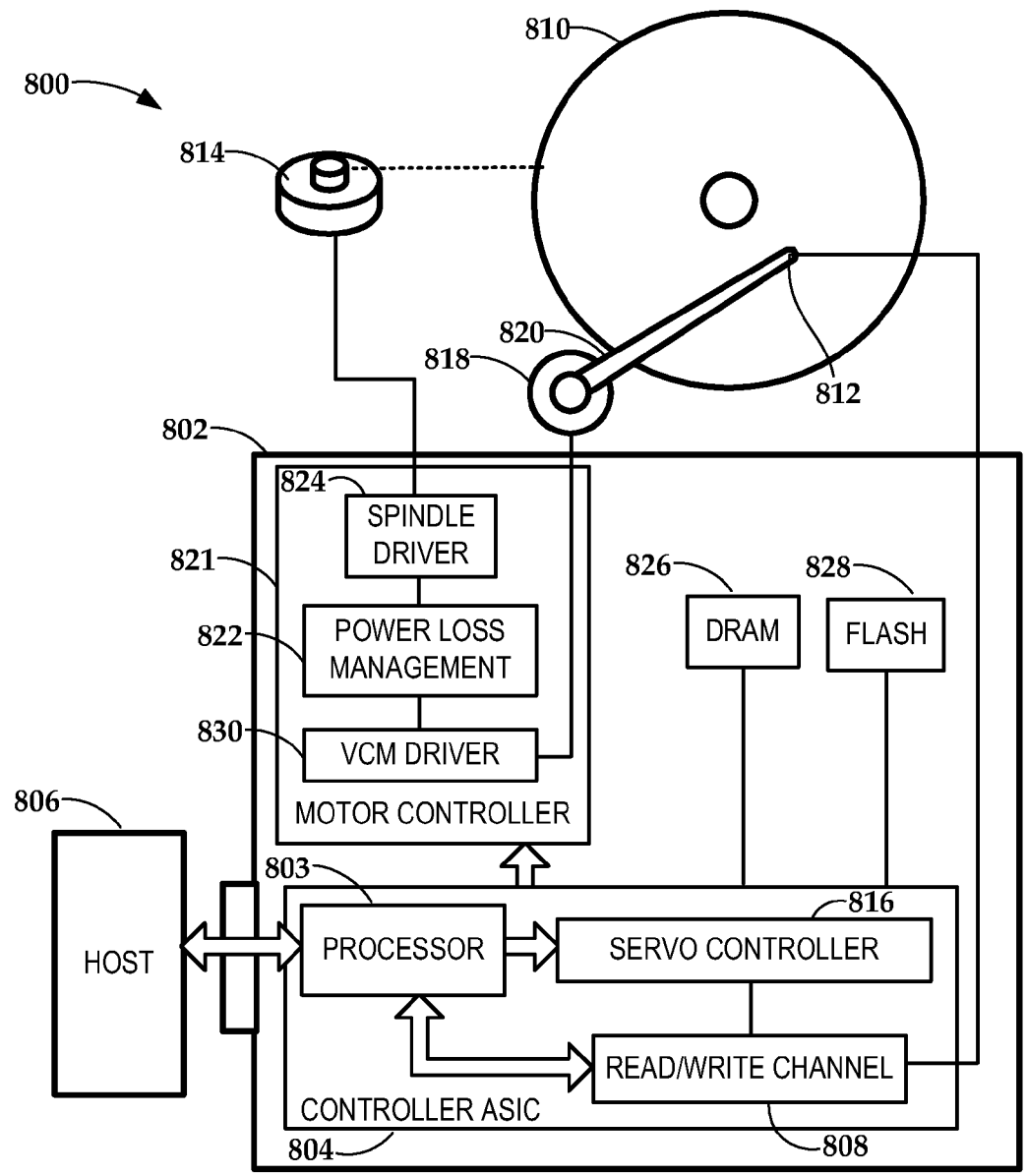
FIG. 8 is a block diagram of a disk drive apparatus according to an example embodiment.

In reference now to FIG. 8, a block diagram illustrates a hard disk drive apparatus 800 according to an example embodiment. The apparatus 800 includes circuitry 802 and other electrical/mechanical components. The circuitry 802 includes a processor 803 within a controller ASIC 804 that controls a number of functions of the apparatus 800, including communications between the apparatus 800 and a host device 806. The host device 806 may include any electronic device that can be communicatively coupled to store and retrieve data from an HDD, e.g., a computer or a server. The controller 804 carries out write commands by formatting the associated data into sectors with the appropriate header information, and transfers the formatted data via a read/write channel 808 to the data storage surface of a disk 810. The controller 804 provides analogous functions for read commands, e.g., determining the location of the desired data, moving the heads to the location (track) of the data, reading the data from the disk 810 via the read/write channel, correcting any errors and formatting the data for the host 806, etc.

The read/write channel 808 can convert data between the digital signals processed by the data controller 804 and the analog signals conducted through read/write heads 812. The read/write channel 808 also provides servo data read from the disk 810 to a servo controller 816. The servo controller 816 uses these signals to drive an actuator 818 (e.g., voice coil motor, or VCM) that rotates an arm 820, upon which the read/write heads 812 are mounted. The heads 812 are moved radially across different tracks of the disk(s) 810 by the actuator motor 818 (e.g., voice coil motor), while a spindle motor 814 rotates the disk(s) 810.

The circuitry also contains a motor controller 821 with circuitry for power loss 822 that manages safeguarding the apparatus 800, and further circuitry for safeguarding associated data in the event of an unexpected power loss. Power loss management modules within 822 may include circuitry that is integrated with and/or external to the ASIC controller 804. For example, the circuitry 822 may include power loss detection circuitry such as shown in FIG. 2, and may be operable with a spindle motor driver 824 that couples the spinning spindle motor 814 to a local power bus (not shown) for providing backup power. The circuitry 822 may also affect features built into the controller ASIC 804 that enable power savings, including power islands for selectively depowering portions of the controller 804; selectably switchable reset and clock lines; communication lines coupled to detect retraction of the actuator 818 via a VCM driver 830, which can trigger further power conservation while actuator retraction is in progress (e.g., suspending the controller 804, signaling to DRAM 826 to go into a self-refresh mode, etc.).

The power loss management modules within 822 may also trigger instructions including with controller firmware and/or included as logic/instructions in other operational components. For example, the instructions may be used to transfer memory from a volatile cache in DRAM 826 to a non-volatile memory, such as flash memory 828. Instructions may be used to switch off non-critical peripheral circuits, such as read/write channel 808 and PHY interfaces to the host 806, as well as triggering internal ASIC power saving operations describe above.

It is to be understood that the structure and/or functionality of apparatus 800 may be different that that illustrated. For example, controllers 804, 816 and other components may be integrated within a common integrated circuit package, or distributed among multiple integrated circuit packages. Similarly, the illustrated connection pathways are provided for purposes of illustration and not of limitation, and some interconnections may be omitted for purposes of clarity. For example, it is contemplated that the controller ASIC 804 may communicate via additional paths (e.g., memory bus) with DRAM 826, for operations such as buffering of read/write data.

The foregoing description of the example embodiments has been presented for the purposes of illustration and description. It is not intended to be exhaustive or to limit the claims to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A controller capable of being coupled to circuitry of a hard disk drive, the controller configured to:
    in response to the hard disk drive losing primary power, obtain power from a spinning motor of the hard disk drive; and
    selectively depower portions of the controller to facilitate performing safeguard operations via the controller using the power obtained from the spinning motor.

2. The controller of claim 1, wherein the safeguard operations comprise:
    causing a read/write actuator to retract; and
    storing data from a volatile memory to a non-volatile memory of the hard disk drive.

3. The controller of claim 2, wherein the controller is further configured to:
    receive a signal indicating the retraction of the read/write actuator; and
    in response to the signal, halt operations of the controller while the retraction is in progress.

4. The controller of claim 3, wherein the controller is further configured to cause dynamic random access memory of the hard disk drive to enter a self-refresh mode while the retraction is in progress.

5. The controller of claim 1, wherein selectively depowering the portions of the controller comprises turning off electricity that separately powers a part of the controller.

6. The controller of claim 1, wherein selectively depowering the portions of the controller comprises turning off a clock signal to a part of the controller.

7. The controller of claim 1, wherein selectively depowering the portions of the controller comprises placing a part of the controller in a reset mode.

8. The controller of claim 1, wherein selectively depowering the portions of the controller comprises placing a static random access memory of the controller in a low power mode.

9. The controller of claim 1, wherein the hard disk drive comprises a form factor of 2.5 inch or smaller.

10. A method comprising:
    in response to a hard disk drive losing primary power, obtaining power from a spinning motor of the hard disk drive; and
    selectively depowering portions of a controller of the hard disk drive to facilitate performing safeguard operations via the controller using the power obtained from the spinning motor.

11. The method of claim 10, wherein the safeguard operations comprise:
    retracting a read/write actuator; and
    storing volatile cached data to a non-volatile memory of the hard disk drive.

12. The method of claim 11, further comprising:
    signaling the retraction of the read/write actuator to the controller; and
    in response to the signal, halting the controller while the retraction is in progress.

13. The method of claim 12, further comprising causing dynamic random access memory of the hard disk drive to enter a self-refresh mode while the retraction is in progress.

14. The method of claim 10, wherein selectively depowering the portions of the controller comprises at least one of:
    turning off the electricity to a power line that separately powers a first part of the controller;
    turning off a clock signal to a second part of the controller;
    placing a third part of the controller in a reset mode; and
    placing a static random access memory of the controller in a low power mode.

15. An apparatus comprising:
    a power loss detection circuit configured to provide a power loss signal responsive to the apparatus losing primary power;
    a power supply circuit coupled to the power loss detection circuit and configured to provide shutdown power from a spinning disk motor of a hard disk drive in response to the power loss signal; and
    a controller coupled to the power loss detection circuit and including portions that are selectively depowered responsive to the power loss signal;
    wherein the apparatus is configured to perform safeguard operations of the hard disk drive using the shutdown power in response to the power loss signal.

16. The apparatus of claim 15, wherein the safeguard operations comprise:
    causing a read/write actuator to retract; and
    storing data from volatile memory to a non-volatile memory of the hard disk drive.

17. The apparatus of claim 16, wherein the apparatus is further configured to:
    receive a signal indicating the retraction of the read/write actuator; and
    in response to the signal, halt operations of the controller while the retraction is in progress.

18. The apparatus of claim 17, wherein the apparatus is further configured to cause dynamic random access memory of the hard disk drive to enter a self-refresh mode while the retraction is in progress.

19. The apparatus of claim 15, wherein selectively depowering the portions of the controller comprises at least one of:
    turning off a power line that separately powers a first part of the controller;
    turning off a clock signal to a second part of the controller;
    placing a third part of the controller in a reset mode; and
    placing a static random access memory of the controller in a low power mode.

20. The apparatus of claim 15, wherein the wherein the apparatus places an electrical load upon a host system similar to that of an equivalent hard disk drive, wherein the equivalent hard disk drive does not include the power supply circuit configured to provide shutdown power from the spinning disk motor of the hard disk drive.

* * * * *